July 4, 1950 L. F. FRASER 2,513,304
HYDRAULIC PUMP UNLOADING VALVE
Filed Feb. 19, 1945
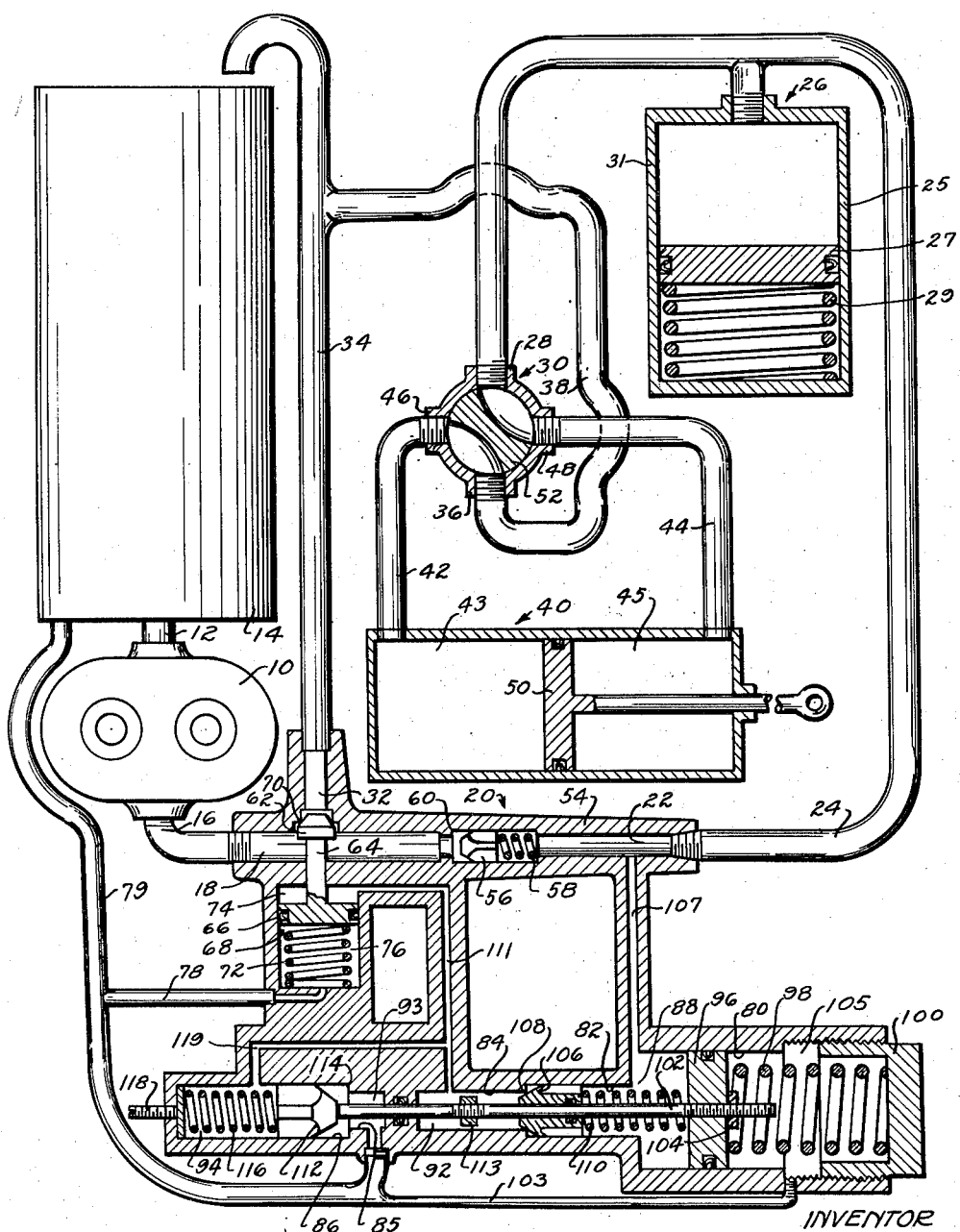
INVENTOR
LLOYD F. FRASER
BY
ATTORNEYS Patented July 4, 1950

2,513,304

UNITED STATES PATENT OFFICE 2,513,304

HYDRAULIC PUMP UNLOADING VALVE

Lloyd F. Fraser, Tulsa, Okla.

Application February 19, 1945, Serial No. 578,754

4 Claims. (Cl. 137—153)

(Granted under the act of March 3, 1883, as amended April 30, 1928; 370 O. G. 757)

The invention described herein may be manufactured and used by or for Government for governmental purposes, without the payment to me of any royalty thereon.

This invention relates to hydraulic systems and particularly to an unloading valve mechanism applicable to such systems. The invention is readily adaptable to a situation where one or a plurality of hydraulically actuable devices are operable by enforced circulation of a hydraulic medium through a closed circuit. It is, for instance, applicable to an airplane for controlling the several actuators which operate the wing flaps, cowl flaps, windshield wipers, bomb bay doors, etc., but while this is a situation in which the device is particularly useful, it is equally adaptable to any situation where hydraulically actuable devices operate only intermittently and/or where the pump supplying fluid under pressure delivers a greater volume of fluid into the system than is required by the hydraulically actuable devices.

Hydraulic systems of this class usually consist of a constant-speed pump which charges the hydraulic accumulator at the pressure desired for operating the control units, fluid under the desired pressure being drawn from the accumulator or from the high side of the system into which the accumulator is connected at such intervals as the control units are required to be actuated. Inasmuch as the speed of the pump is constant and the delivery of fluid by the pump into the system is in excess of that required in the operation, and because the demand on the fluid supply is intermittent, some means is necessarily provided for disposing of the surplus fluid being discharged by the pump into the high pressure side of the system.

The manner in which the foregoing difficulty is ordinarily solved is by providing the well-known poppet release valve which is spring loaded to keep it on its seat until the maximum system pressure is reached whereupon the pressure raises it and allows the surplus fluid to be bypassed back to the low-pressure side. It is well known, however, that the pump with this arrangement must operate against the full pressure of the high-pressure side at all times.

The disadvantage has created a need for an unloading valve, a device whereby when the maximum system pressure is reached a return valve opens wide and connects the discharge side of the pump back to the low-pressure side and coincidentally a check valve closes to separate the discharge side of the pump from the accumulator which thereby prevents escape of fluid under pressure from the accumulator back to the return valve whereby the pump operates against substantially zero pressure until the system pressure drops a predetermined amount and the return fluid flow is again stopped by closing of the valve.

Unloading valves as heretofore proposed have been complicated in construction, costly to manufacture and difficult to maintain in proper adjustment.

It is therefore an object of this invention to provide a valve of a sort which is simple, effective, and at a comparatively low cost and having no parts which require critical adjustment. In a valve of this type it is a requirement that when the return valve opens to unload the pump and coincidentally separate the discharge side of the pump from the accumulator, a considerable drop in accumulator pressure should take place before the return valve again closes.

It is therefore another object of this invention to provide means whereby the overlap between the opening of the return valve to unload the pump and the closing of the return valve to restore the pump to its active condition may be accurately controlled.

Other objects will become evident from a consideration of the following description when taken in conjunction with the drawings, wherein, the single figure of the drawings schematically shows an improved unloading valve mechanism in longitudinal vertical section connected in a simple hydraulic system to which it is applicable.

In the drawing a pump 10 has a suction side 12 connected to the supply tank 14 and its discharge side 16 connected to the fluid inlet passageway 18 of my improved unloading valve 20. The fluid discharge passageway 22 of the unloading valve is connected by a pipe 24 to an accumulator 26, which for purposes of illustration consists of a cylindrical housing 25, a piston 27 slidable therein, and a spring 29 urging the piston toward the space 31 within the cylinder.

The pipe 24 continues on past the accumulator extending to one terminal 28 of a selector valve 30. The main fluid return passage 32 is connected by a pipe 34 to the top of the tank 14. Terminal 36 of the selector valve 30 is connected by a pipe 38 to the pipe 34 and thus back to the tank 14. Opposite ends of an actuator 40 are connected by pipes 42 and 44 to the terminals 46 and 48, respectively, of the selector valve 30.

A piston 50 is moved in one or the other directions as fluid enters the actuator through pipe 42 into the space 43 or through pipe 44 into the space 45 depending on which position the plug 52 of the actuator valve occupies at that time. The unloading valve assembly 20 comprises a body valve 54 containing a fluid inlet passageway 18, the fluid discharge passageway 22 and the main fluid return passageway 32. A main check valve 56 is kept from its seat 60 by fluid flow, a spring 58 being provided to urge the valve 56 to its closed position.

When the main check valve 56 is open it permits the passage of fluid from the pump 10 through the main check valve 56 to the accumulator 26 and to the selector valve 30 but when it is closed prevents fluid flow from the fluid discharge passageway 22 back through the main check valve 56 to the fluid inlet passageway 18. The return check valve 62 has a stem 64 with a return check valve actuating piston 66 at its free end, the piston being slidable in a return check valve actuating cylinder 68. Pressure in the fluid inlet passageway 18 holds the return check valve 62 on its seat 70 when the valve is closed. A light spring 72 also acts against the return check valve actuating piston 66 and urges the return check valve 62 to its closed position when it is open. Fluid under system pressure entering the chamber 74 will open the valve 62 against system pressure tending to close it by reason of the greater effective area of the piston 66 over the effective area on the valve 62. The chamber 76 around the spring 72 may be vented to the atmosphere or it may be connected as by an auxiliary return pipe 78 to the larger pipe 79 and thereafter back to the tank 14 whereby any leakage past the piston 66 will be returned to the tank 14.

Extending through the body 54 are a series of axially aligned bores 80, 82, 84, 85, and 86, which define chambers 88, 92, 93, and 94. An auxiliary-valve actuating piston 96 is slidable in the bore 80 and is urged toward the left end of its travel by the spring 98, the tension of which is regulatable by the hollow externally threaded cap 100. A piston rod 102 is axially adjustable in the piston 96 by the nut 104 and comprises the linkage whereby the auxiliary-valve actuating piston 96 actuates the two auxiliary valves 106 and 112. Another auxiliary return pipe 103 connects the chamber 105 which contains the spring 98 back to the tank 14 by way of the pipe 79.

The passageway 107 joins the chamber 88 to the fluid discharge passageway 22. The first auxiliary check valve 106 is axially movable in the bore 82 and is normally kept on its seat 108 by pressure in the chamber 88 whereby the chambers 88 and 92 are kept separated. A spring 110 assists somewhat in keeping the first auxiliary check valve 106 closed but its principal function is to urge the valve to its closed position when it is open. An internally threaded collar 113 on a threaded portion on the rod 102 is adjustable to define the position of the auxiliary valve actuating piston 96 at which the first-auxiliary check valve 106 will be opened. A passageway 111 joins the chamber 92 to the chamber 74 above the piston 66. The second auxiliary check valve 112 is axially movable in the bore 86 and, whether closed or open, is urged to the right toward its seat 114 by the spring 116, the tension of which is adjustable by the screw 118.

When the second auxiliary check valve 112 is closed and the first auxiliary check valve 106 is open, full system pressure is applied to the valve 112 to hold it on its seat. When valve 112 seats, it separates chambers 93 and 94. The seating of the valve 112 may be prevented upon contact with the end of the auxiliary valve actuating piston rod 102 until the piston 96 moves slightly further toward the right than the position shown in the drawing. Chamber 93 is connected back to the tank by the pipe 79. A passageway 119 joins the chamber 94 to the passageway 111 whereby the chamber 94 is in communication with the chamber 74. The operation of the system shown, which includes an embodiment of my improved unloading valve, is as follows:

Rotation of the pump 10 draws fluid from the tank 14, discharges it into the fluid inlet passageway 18 and forces the main check valve 56 open and delivers the fluid from the fluid discharge passageway 22 through pipe 24 into the accumulator 26 and to the terminal 28 of the selector valve 30. With the plug 52 of the selector valve positioned as shown the fluid will flow from the terminal 28 out through the terminal 48 and pipe 44 into the space 45, thereby moving the piston 50 to the left.

By turning the plug 52 through one-quarter turn fluid will flow from the terminal 28 out through the terminal 46 and pipe 42 into the space 43, thereby moving the piston 50 to the right. As long as the accumulator is not fully charged to the desired system pressure, the accumulator piston 27 will continue to move downward and compress the spring 29, and coincidentally the auxiliary valve actuating piston 96 will be moved to the right against the resistance of the spring 98.

When the rising pressure has moved the accumulator piston 27 down slightly farther than shown in the drawing, the auxiliary valve actuating piston 96 will have moved to the right enough farther than shown to allow the second auxiliary check valve 112 to rest on its seat 114, thereby shutting off the chamber 74 from communication with the chamber 93 and therefore from communication with the common auxiliary return pipe 79. At the point where the second auxiliary check valve 112 has been closed to interrupt the passageways which normally connect the chamber 94 back to the tank, neither the accumulator piston 27 nor the smaller auxiliary valve actuating piston 96 have yet reached the position of full system pressure.

Thereafter the auxiliary valve actuating piston 96 and the piston rod 102 moves still farther to the right until the adjustable collar 113 has contacted the first auxiliary check valve 106 and pushed it from its seat, the collar being so adjusted that the opening of the first auxiliary check valve 106 occurs just as the desired system pressure is reached. As soon as the first auxiliary check valve 106 is very slightly opened, the pressure in chamber 88 and 92 will substantially equalize, and thereafter the auxiliary valve actuating piston 96 may be moved to the right more easily than before by fluid which will be transferred back to the chamber 88 by the accumulator 26.

It follows that, once the first auxiliary check valve 106 has broken away from its seat 108, it will move to a relatively wide open position. When this happens the chamber 74 will be connected by passageway 111, chambers 92 and 88, and passageway 107 to the fluid discharge passageway 22 whereby the return valve actuating piston 66 will be subjected to full system pressure for opening the return check valve 62 and the second auxiliary check valve 112 will be held shut by full system pressure to prevent escape of fluid to chamber 93 and back to the tank.

As soon as the return check valve 62 is opened very slightly the pressure in the fluid inlet passageway 18 will be below that in the fluid discharge passageway 22, whereupon the main check valve 56 will close. Thereafter the accumulator must assume the burden of supplying fluid under pressure to the chamber 74 for opening the return check valve 62 widely.

The accumulator will therefore continue to supply fluid through the first auxiliary check valve 106 to the chamber 74 until the return check valve 62 is wide open, provided, of course, that the several chambers are so proportioned that the volume of fluid drawn from the accumulator to move the return valve actuating piston 66 all the way down, does not permit the auxiliary valve actuating piston 96 to move left more than it moved to the right at the instant that the first auxiliary check valve 106 was broken away from its seat, for otherwise the return check valve 62 would not be fully opened.

After the return check valve 62 is thus opened wide to completely unload the pump 10, and the first auxiliary check valve 106 is again seated, the return check valve will remain wide open until use of fluid by the actuator 40 allows the auxiliary valve actuating piston 96 to move left enough farther to push the second auxiliary check valve 112 off its seat, whereupon the chamber 74 is connected back to the tank 14 and the return check valve actuating piston 66 will be raised by the spring 72 to close the return check valve 62 as shown in the drawing.

It is noted that when the return check valve 62 has been fully opened, and the pump is completely unloaded and the auxiliary check valve actuating piston 96 has moved farther left due to a drop in accumulator pressure, the closing of the first auxiliary check valve 106 ahead of the opening of the second auxiliary check valve 112, will, in the interim, allow enough leakage of pressure either past the return check valve actuating piston 66 or past the second auxiliary check valve 112 to reduce the pressure to a point where the spring 98 will not have to push the valve 112 off its seat against the full system pressure. It is also noted, that, inasmuch as the leakage past the pistons 66 and 96 may be slight, the chambers 76 and 105 may be vented to the atmosphere, and the return pipes 78 and 103 omitted.

In the claims the chambers 74, 76, 105, 88, 92, 93 and 94 will be referred to as the first, second, third, fourth, fifth, sixth and seventh chambers respectively.

Having described an embodiment of my invention, I claim:

1. An improved hydraulic unloading valve mechanism which comprises a valve body having a fluid inlet passageway and a fluid discharge passageway, a main check valve biased to prevent flow from the fluid discharge passageway back to the fluid inlet passageway, a main fluid return passageway, a return check valve biased to prevent flow from the fluid inlet passageway back to the said main fluid return passageway, a return check valve actuating cylinder, a return check valve actuating piston dividing said return check valve actuating cylinder into a first and a second chamber, an auxiliary check valve actuating cylinder, an auxiliary check valve actuating piston dividing said auxiliary check valve actuating cylinder into a third and a fourth chamber, a fifth chamber, a first auxiliary check valve biased to prevent flow from the fourth to the fifth chamber, a sixth and a seventh chamber, a second auxiliary check valve biased to prevent flow from the seventh back to the sixth chamber, a passageway connecting the fourth chamber to the space between the main check valve and the discharge passageway, a passageway connecting the first chamber to the fifth and seventh chambers, auxiliary fluid return passageways extending from the second, third and sixth chambers, and linkage connecting the auxiliary valve actuating piston to the first and second auxiliary check valves, whereby movement of said auxiliary valve actuating piston in response to a predetermined pressure within the fourth chamber opens the said first auxiliary check valve and allows the said second auxiliary check valve to close.

2. The device defined in claim 1 with springs urging the several valves to the closed position.

3. An improved hydraulic unloading valve mechanism which comprises a valve body having a fluid inlet passageway and a fluid discharge passageway, a main check valve biased to prevent flow from the fluid discharge passageway back to the fluid inlet passageway, a main fluid return passageway, a return check valve biased to prevent flow from the fluid inlet passageway back to the said main fluid return passageway, a return valve actuating cylinder, a return valve actuating piston dividing said return valve actuating cylinder into a first and a second chamber, an auxiliary valve actuating cylinder, an auxiliary valve actuating piston dividing said auxiliary valve actuating cylinder into a third and a fourth chamber, a fifth chamber, a first auxiliary check valve biased to prevent flow from the fourth to the fifth chamber, a sixth and a seventh chamber, a second auxiliary check valve biased to prevent flow from the seventh back to the sixth chamber, a passageway connecting the fourth chamber to the space between the main check valve and the discharge passageway, a passageway connecting the first chamber to the fifth and seventh chambers, an auxiliary fluid return passageway extending from the sixth chamber, means for venting the second and third chambers, and linkage connecting the auxiliary valve actuating piston to the first and second auxiliary check valve whereby movement of said auxiliary valve actuating piston in response to a predetermined pressure within the fourth chamber opens the said first auxiliary check valve and allows the said second auxiliary check valve to close.

4. An improved hydraulic unloading valve mechanism which comprises a valve body having a fluid inlet passageway and a fluid discharge passageway, a main valve adapted to prevent flow from the fluid discharge passageway back to the fluid inlet passageway, a main fluid return passageway, a return valve adapted to prevent flow from the fluid inlet passageway back to the said main fluid return passageway, a return valve actuating cylinder, a return valve actuating piston dividing said return valve actuating cylinder into a first and a second chamber, an auxiliary valve actuating cylinder, an auxiliary valve actuating piston dividing said auxiliary valve actuating cylinder into a third and a fourth chamber, a fifth chamber, a first auxiliary valve adapted to prevent flow from the fourth to the fifth chamber, a sixth and a seventh chamber, a second auxiliary valve adapted to prevent flow from the seventh back to the sixth chamber, a passageway connecting the fourth chamber to the space between the main valve and the discharge passageway, a passageway connecting the first chamber to the fifth and seventh chambers, an auxiliary fluid return passageway extending from the sixth chamber, means for venting the second and third chambers, and linkage connecting the auxiliary valve actuating piston to the first and second auxiliary valves, whereby movement of said auxiliary valve actuating piston in response to a predetermined pressure within the fourth chamber opens the said first auxiliary valve and allows the said second auxiliary valve to close.

LLOYD F. FRASER.

REFERENCES CITED

The following references are of record in the file of this patent:

UNITED STATES PATENTS

| Number | Name | Date |
|---|---|---|
| 726,841 | Ball | May 5, 1903 |
| 2,015,801 | Johnson | Oct. 1, 1935 |
| 2,214,817 | Harrington | Sept. 17, 1940 |
| 2,241,665 | Herman | May 13, 1941 |
| 2,264,375 | Hill | Dec. 2, 1941 |
| 2,279,176 | Pardee | Apr. 7, 1942 |
| 2,313,351 | Magnuson | Mar. 9, 1943 |
| 2,316,445 | Marshall | Apr. 13, 1943 |
| 2,342,001 | Magnuson | Feb. 15, 1944 |